US012300087B2

(12) United States Patent
Cort et al.

(10) Patent No.: US 12,300,087 B2
(45) Date of Patent: *May 13, 2025

(54) AUTO-NOTIFICATION SENSOR FOR ADJUSTING OF A WEARABLE DEVICE

(71) Applicant: Hand Held Products, Inc., Charlotte, NC (US)

(72) Inventors: Emily N. Cort, Oaklyn, NJ (US); Dwight Linwood Franz, Haddonfield, NJ (US); Blake E. Dunbar, Fayetteville, PA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,286

(22) Filed: Feb. 14, 2024

(65) Prior Publication Data

US 2024/0185701 A1    Jun. 6, 2024

Related U.S. Application Data

(63) Continuation of application No. 17/805,603, filed on Jun. 6, 2022, now Pat. No. 11,935,386.

(51) Int. Cl.
*G08B 21/18* (2006.01)
*G06K 7/14* (2006.01)

(52) U.S. Cl.
CPC ........... *G08B 21/18* (2013.01); *G06K 7/1413* (2013.01)

(58) Field of Classification Search
CPC ...... G06K 7/1413; G08B 21/18; G06F 3/016; G06F 3/014; G06F 3/011; G06F 1/1686; G06F 1/163
See application file for complete search history.

(56) References Cited

U.S. PATENT DOCUMENTS 5,907,148 A * 5/1999 Iwafuchi ............ G06K 7/10732
235/472.01
6,298,176 B2 * 10/2001 Longacre, Jr. ....... G06K 7/1443
382/312

(Continued)

FOREIGN PATENT DOCUMENTS

EP    3037924 A1    6/2016
EP    3644217 A1    4/2020

OTHER PUBLICATIONS

Examiner Interview Summary Record (PTOL-413) Mailed on Nov. 16, 2023 for U.S. Appl. No. 17/805,603, 1 page(s).

(Continued)

*Primary Examiner* — Steven Lim
*Assistant Examiner* — Son M Tang
(74) *Attorney, Agent, or Firm* — Alston & Bird LLP

(57) ABSTRACT

Methods, apparatus, and computer program products for alerting a user of a wearable device to adjust the position of the device are provided. An example method includes receiving environment data from a wearable device sensor, wherein the wearable device is mountable on an arm of the user and directed toward a hand of the user, the environment data including a representation of a calibrating object and a target machine-readable code having a determinable size. The example method further decodes the target machine-readable code. Additionally, the example method determines a position of the wearable device on the arm of the user based on the size of the calibrating object and the size of the target machine-readable code. The example method alerts the user to adjust the position of the wearable device when the position of the wearable device relative to the calibrating object exceeds a predetermined threshold.

20 Claims, 8 Drawing Sheets

(56) References Cited

U.S. PATENT DOCUMENTS

| | | | |
|---|---|---|---|
| 8,945,017 B2 | 2/2015 | Venkatraman et al. | |
| 9,071,785 B2* | 6/2015 | Cassanego | H04N 1/387 |
| 9,324,016 B1* | 4/2016 | Cordes | G06Q 30/018 |
| 10,034,501 B2* | 7/2018 | Jensen | A41D 19/01505 |
| 10,699,806 B1* | 6/2020 | Toumazou | A61B 5/1116 |
| 11,221,217 B1* | 1/2022 | Kahle | G01S 17/42 |
| 2003/0208110 A1* | 11/2003 | Mault | A61B 5/6826 |
| | | | 600/300 |
| 2007/0172123 A1* | 7/2007 | Komatsubara | G06V 10/225 |
| | | | 382/175 |
| 2007/0297695 A1* | 12/2007 | Aratani | G06T 7/73 |
| | | | 382/284 |
| 2013/0237865 A1* | 9/2013 | Sato | A61B 5/6824 |
| | | | 600/499 |
| 2013/0342573 A1* | 12/2013 | Leazenby | G06T 19/006 |
| | | | 345/633 |
| 2015/0199549 A1* | 7/2015 | Lei | G06K 7/10722 |
| | | | 235/462.24 |
| 2016/0088707 A1* | 3/2016 | Van De Sluis | H05B 45/10 |
| | | | 315/297 |
| 2016/0206206 A1 | 7/2016 | Avila et al. | |
| 2018/0078183 A1* | 3/2018 | Lor | G06F 3/011 |
| 2018/0103859 A1* | 4/2018 | Provenzano | A61B 5/0024 |
| 2018/0374567 A1* | 12/2018 | Toumazou | G16H 20/60 |
| 2019/0142288 A1* | 5/2019 | Aliamiri | A61B 5/6885 |
| | | | 600/301 |
| 2019/0243456 A1* | 8/2019 | Han | G06F 1/1686 |
| 2020/0134275 A1* | 4/2020 | Sakamoto | G06K 7/10396 |
| 2020/0195293 A1* | 6/2020 | Leabman | A61B 5/0024 |
| 2020/0279389 A1* | 9/2020 | McIver | G06T 7/12 |
| 2020/0300929 A1* | 9/2020 | Omura | G04G 99/006 |
| 2020/0326780 A1* | 10/2020 | Kearney | G06F 3/04815 |
| 2021/0278898 A1* | 9/2021 | Erivantcev | G09G 3/32 |
| 2022/0050425 A1* | 2/2022 | Connor | G04G 21/02 |
| 2022/0087529 A1* | 3/2022 | Chen | A61B 5/0059 |
| 2023/0329426 A1* | 10/2023 | Dunbar | A45F 5/00 |

OTHER PUBLICATIONS

Extended European Search Report Mailed on Oct. 26, 2023 for EP Application No. 23171830, 11 page(s).

Notice of Allowance and Fees Due (PTOL-85) Mailed on Nov. 16, 2023 for U.S. Appl. No. 17/805,603, 10 page(s).

* cited by examiner

AUTO-NOTIFICATION SENSOR FOR ADJUSTING OF A WEARABLE DEVICE

CROSS-REFERENCE TO RELATED APPLICATIONS

The present application is a continuation of U.S. patent application Ser. No. 17/805,603, filed Jun. 6, 2022, the contents of which is hereby incorporated by reference in its entirety.

TECHNOLOGICAL FIELD

Embodiments of the present disclosure relate generally to an auto-notification sensor capable of alerting a user to adjust a wearable device in an instance in which the device is positioned such that a wearable device sensor may be obstructed.

BACKGROUND

Applicant has identified many technical challenges and difficulties associated with proper placement of a wearable scanning device on a user's arm. Through applied effort, ingenuity, and innovation, Applicant has solved problems related to the position of these and other wearable devices by developing solutions embodied in the present disclosure, which are described in detail below.

BRIEF SUMMARY

Various embodiments are directed to an example method, apparatus, and computer program product for alerting a user to adjust a wearable device in an instance in which the wearable device may be positioned incorrectly.

In accordance with some embodiments of the present disclosure, an example method for alerting a user to adjust a wearable device is provided. In some embodiments, the method may comprise receiving environment data from a wearable device sensor communicatively connected to the wearable device, wherein the wearable device is mountable on an arm of the user such that the wearable device sensor is directed toward a hand of the user, wherein the environment data comprises a representation of at least a portion of a calibrating object having at least one calibrating dimension of a predetermined size. In addition, the method may comprise determining a position of the wearable device on the arm of the user relative to the calibrating object based at least in part on the captured environment data. Finally, the method may comprise alerting the user to adjust the position of the wearable device based on the position of the wearable device relative to the calibrating object in an instance in which the position of the wearable device relative to the calibrating object exceeds a predetermined threshold.

In some embodiments, the method may further comprise receiving, from a user, the at least one calibrating dimension of the calibrating object.

In some embodiments, the at least one calibrating dimension may be associated with a user identifier corresponding to the user and stored in a memory storage communicatively connected to the wearable device.

In some embodiments, the calibrating object is at least one of a hand of the user, a symbol, and a set of symbols.

In some embodiments, the at least one of a symbol and the set of symbols is inscribed on a glove.

In some embodiments, the wearable device may comprise a barcode scanner comprising a laser source and receive optics.

In some embodiments, the method may further comprise continually determining at an interval the position of the wearable device relative to the calibrating object.

In some embodiments, the user may be directed to adjust the position of the wearable device by at least one of a sound, image, text, and haptic feedback.

In some embodiments, the wearable device sensor may further comprise a housing and the wearable device sensor may be disposed within the housing.

An example wearable apparatus mountable on an arm of a user is further included. In some embodiments, the example wearable apparatus comprises a wearable device sensor communicatively connected to the wearable apparatus and directed toward a hand of the user, wherein the wearable device sensor collects environment data representative of at least a portion of a calibrating object having at least one calibrating dimension of a predetermined size. The example wearable apparatus may also comprise at least one processor and at least one memory including program code. In some embodiments, the at least one memory and the program code may be configured to, with the at least one processor, cause the wearable apparatus to at least receive environment data from the wearable device sensor, determine a position of the wearable apparatus on the arm of the user relative to the calibrating object based at least in part on the captured environment data, and alert the user to adjust the position of the wearable apparatus based on the position of the wearable apparatus relative to the calibrating object.

In some embodiments, the wearable apparatus may be further configured to receive, from a user, the at least one calibrating dimension of the calibrating object.

In some embodiments, the at least one calibrating dimension may be associated with a user identifier corresponding to the user and stored in a memory storage communicatively connected to the wearable apparatus.

In some embodiments, the calibrating object may be at least one of a hand of the user, a symbol, and a set of symbols.

In some embodiments, the at least one of a symbol and the set of symbols may be inscribed on a glove.

In some embodiments, the wearable device may comprise a barcode scanner comprising a laser source and receive optics.

In some embodiments, the wearable apparatus may be further configured to continually determine at an interval the position of the wearable apparatus relative to the calibrating object.

In some embodiments, the user may be directed to adjust the position of the wearable apparatus by at least one of a sound, image, text, and haptic feedback.

In some embodiments, the wearable device sensor may further comprise a housing and the wearable device sensor may be disposed within the housing.

An example computer program product for alerting a user to adjust a wearable device is further included. In some embodiments, the computer program product may comprise at least one non-transitory computer-readable storage medium storing program instructions that, when executed, cause the computer program product to receive environment data from a wearable device sensor communicatively connected to the wearable device, wherein the wearable device is mountable on an arm of the user such that the wearable device sensor is directed toward a hand of the user, wherein the environment data comprises a representation of at least a portion of a calibrating object having at least one calibrating dimension of a predetermined size. In addition, the computer program product may also determine a position of the wearable device on the arm of the user relative to the calibrating object based at least in part on the captured environment data. Also, the computer program product may alert the user to adjust the position of the wearable device based on the position of the wearable device relative to the calibrating object in an instance in which the position of the wearable device relative to the calibrating object exceeds a predetermined threshold.

In some embodiments, the computer program product may further be configured to continually determine at an interval the position of the wearable device relative to the calibrating object.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
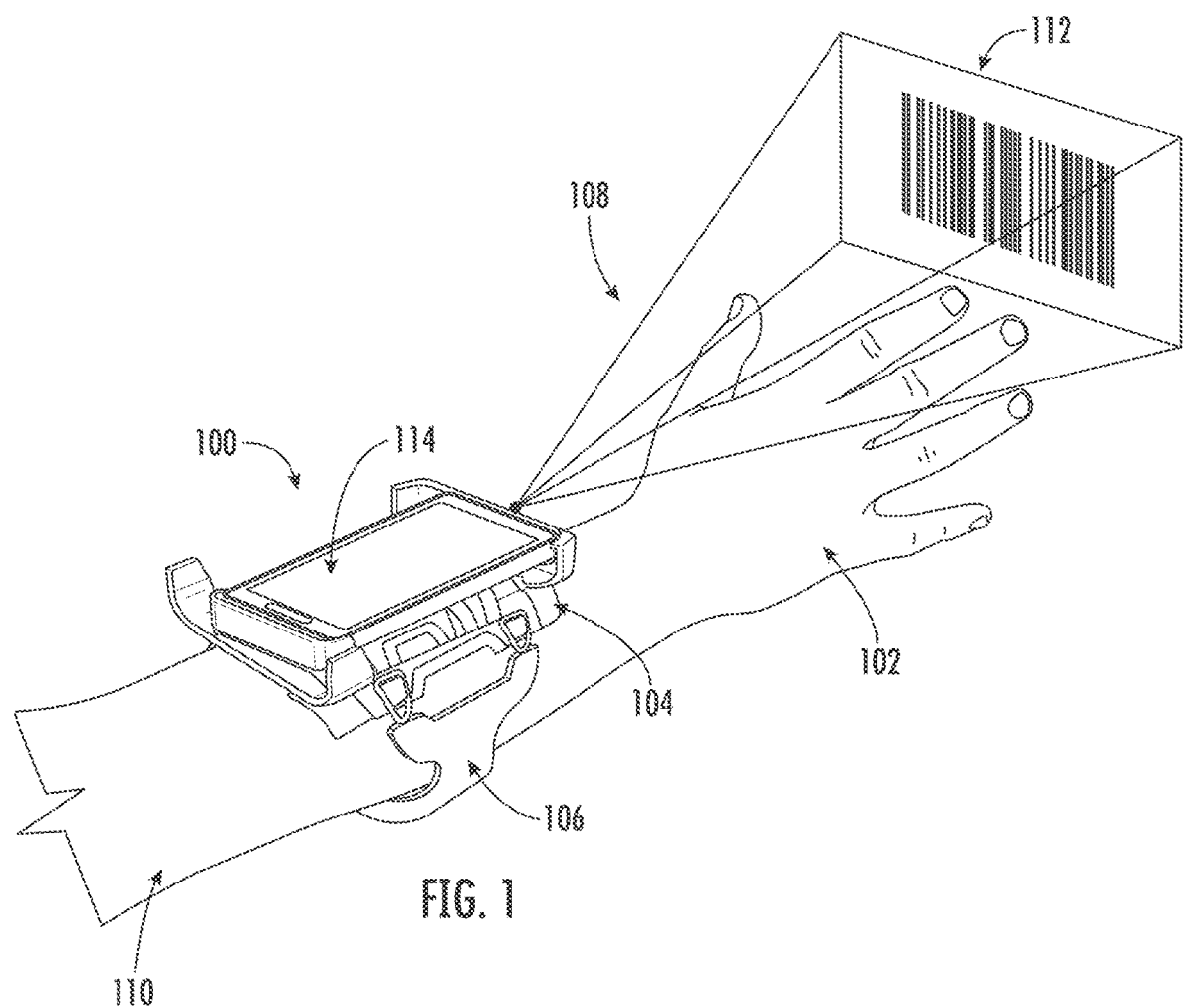
FIG. 1 illustrates a perspective view of an example wearable device configured to alert a user to adjust a position in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with positioning a wearable device, such as an optical scanner and/or a mobile computer with an optical scanner, on an arm of a user. As understood by those of skill in the field to which the present disclosure pertains, there are numerous example scenarios in which a user may need to attach a wearable device containing a wearable device sensor in such a way to allow the user continued use of their hands.

For example, many wearable device sensors provide the ability to scan and/or capture data from a machine-readable label, for example, a one-dimensional barcode, a two-dimensional bar code, printed text, or other similar label. Standard strapping devices allow a user to mount a wearable device containing a wearable device sensor to their arm, with the wearable device sensor directed toward the user's hand. Such a setup allows for efficient scanning and further enables the user to quickly point the wearable device sensor at items of interest and accurately read or capture the target data while maintaining use of their hands. Improper positioning of the wearable device may result in full or partial occlusion of the wearable device sensor's field of view.

In some examples, occlusion of the field of view leads to difficulty in scanning a target machine-readable label. In addition, even if a wearable device is initially positioned correctly, the wearable device may move during mounting or during operation, again inhibiting the wearable device sensor in scanning target machine-readable labels.

Finally, and in some examples, improper positioning of the wearable device may result in discomfort to the user, since the user may not be able to fully utilize the ergonomic properties of the device. In addition, a user may have to contort their hand and/or arm in awkward positions (sometimes subconsciously) to capture a target machine-readable label when the wearable device is improperly positioned. Moreover, a user may not be able to manipulate the mobile computing function if the wearable device is improperly positioned.

The various example embodiments described herein utilize various techniques to ensure proper positioning of a wearable device. For example, in some embodiments, a wearable device utilizing a wearable device sensor and a processor may determine the distance from the wearable device to the user's hand. The wearable device may also determine whether the field of view of the wearable device sensor is occluded based on the distance of the wearable device from the user's hand. In an instance in which the wearable device is out of position, the wearable device may alert the user that the wearable device may need to be re-positioned. This alert may be provided, for example, through an audible tone or speech; through a graphic, image, or text on the wearable device; and/or through haptic feedback. In some examples, the alert may provide instructions with respect to how the wearable device needs to be re-positioned. A user receiving the alert may then determine that the wearable device needs to be adjusted to prevent occlusion of the target machine-readable label and improve performance of the wearable device sensor.

In addition, in some embodiments disclosed herein, the wearable device may continue to monitor its position on the user's arm at a determined interval, prior to each capture, based on a sensed change in position, and/or the like. This may allow a wearable device to track movement along the user's arm, for example, during operation. If the wearable device shifts out of position, the wearable device may provide an alert, or feedback, to the user to adjust the position of the wearable device.

The wearable device may utilize a variety of methods to determine its position relative to the user's hand or other occluding object. For example, the wearable device may support a calibration procedure in which the user inputs a measured distance of a calibrating object. This measured distance may take the form of something specific to the user (e.g., the width of the user's hand), or a generic object, such as a marking or symbol on the user's glove. In other examples, the measured distance may be a comparison between something specific to a user and a background image. Alternatively or additionally, a particular image or images may be scanned.

In an instance in which a user-specific characteristic is used to determine the distance of the wearable device from a user's hand, the user-specific characteristic may be provided in a calibrating process and saved with an associated user identifier. In such an instance, the user may only need to calibrate one time, one at the beginning of each use, and/or the like. In subsequent uses, the mobile device may access the user-specific characteristic based on the user identifier.

As a result of the herein described example embodiments and in some examples, the effectiveness of a wearable device capturing environment data using a wearable device sensor may be greatly improved. In addition, the strain and discomfort due to improper placement of a wearable device may be eliminated.

FIG. 1 illustrates a perspective view of an example wearable device 100 according to various embodiments described herein. As depicted in the example embodiment of FIG. 1, the wearable device 100 is positioned in a wearable device carriage 104 and attached to a user's arm 110 using a wearable device strap 106. The wearable device 100 is positioned such that the field of view 108 of the wearable device sensor 200 (see FIG. 2) is directed toward a calibrating object (e.g., user's hand 102) and further directed at a machine-readable code 112.

As depicted in FIG. 1, a wearable device 100 may be any device capable of attaching to a user's arm 110 to receive environment data, determining a position based on the received environment data, and alerting a user. In some embodiments, a wearable device 100 may be a device capable of processing received optical data, for example, a mobile computing device, an optical scanner, a barcode scanner, and other similar devices. In some embodiments, a wearable device 100 may provide a user interface 114 capable of receiving user input and/or displaying output data. For example, in some embodiments, a user may utilize a user interface 114 to input calibration data required to determine the position of the wearable device 100. In some embodiments, the user interface 114 may be utilized to provide visual alert feedback. In some embodiments, a wearable device 100 may further include one or more speakers capable of producing audible sound. In some embodiments, a wearable device 100 may also include the capability to vibrate or provide another form of haptic feedback.

As further depicted in FIG. 1, a wearable device carriage 104 and wearable device strap 106 may be utilized to receive a wearable device 100 and attach the wearable device 100 to a user's arm 110 or other appendage. A wearable device carriage 104 may be any mechanism designed to securely hold a wearable device 100 while a wearable device 100 is attached during operation. In some embodiments, a wearable device carriage 104 may be formed to fit the dimensions of the wearable device 100, including snaps, clasps, wings, etc. to receive a wearable device 100. In some embodiments, a wearable device carriage 104 may include an opening or window (e.g., sensor window 202) to allow uninhibited flow of optical data to and from the wearable device 100.

In some embodiments, a wearable device strap 106 may be utilized to attach the wearable device carriage 104 and/or wearable device 100 to the user's arm 110 or other appendage. A wearable device strap 106 may use any mechanism to securely strap the wearable device 100 to the user's arm 110, for example, a hook and loop fastener, snaps, clips, elastic bands, etc. In some embodiments, the wearable device carriage 104 and the wearable device strap 106 may be a single integral device designed to receive the wearable device 100 and attach the wearable device 100 to the user's arm 110, for example, a flexible fabric sleeve.

FIG. 1 further depicts a machine-readable code 112. A machine-readable code 112 may be any code or label capable of providing information to a wearable device 100 utilizing an optical capture device. In some embodiments, the machine-readable code 112 may be a barcode in which a wearable device 100 may output a laser or other light emitting diode (LED) light to reflect off the machine-readable code 112. The wearable device 100 may capture the reflected light and decode the return to determine the information embedded in the machine-readable code 112. In some embodiments, the machine-readable code 112 may consist of a single row of codewords or a two-dimensional shape, such as circles, hexagons, rectangles, squares and the like. In some embodiments, the machine-readable code 112 may be a QR code in which the mobile device utilizes an optical capture device to capture the a visual image and decode the imagery to determine the embedded information. Still, in some embodiments, the machine-readable code 112 may be a code or label containing alphanumeric text in which a wearable device 100 utilizes an optical capture device to capture a visual image and the wearable device 100 decodes the information on the digital image using an optical character recognition (OCR) algorithm or similar scheme.

Figure 2:
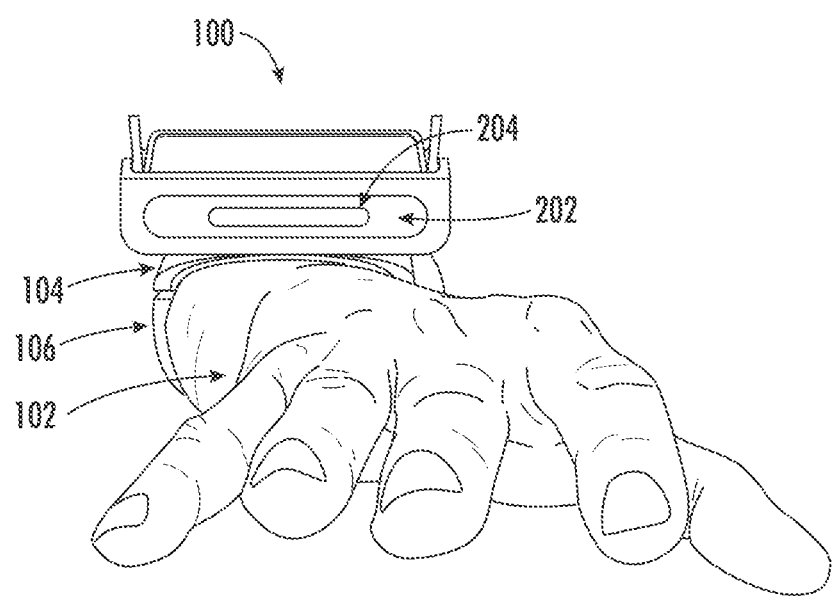
FIG. 2 illustrates a front perspective view of an example wearable device configured to alert a user to adjust a position in accordance with an example embodiment of the present disclosure.

FIG. 2 illustrates a front perspective view of an example wearable device 100. As depicted in the example embodiment of FIG. 2, a wearable device 100 is communicatively connected to a wearable device sensor 200 and further disposed in the housing of the wearable device 100. The example embodiment of FIG. 2 further depicts a sensor window 202 through which light may be emitted and/or received. The example embodiment further depicts the field of view 108 of the wearable device sensor 200 and an example zone from which the wearable device sensor 200 captures environment data.

As depicted in FIG. 2, the example embodiment includes a wearable device sensor 200. A wearable device sensor 200 may be any sensor device capable of receiving optical data from the surrounding environment, for example a camera. In some embodiments, a wearable device sensor 200 may further include a light source capable of emitting light, for example, a laser. In wearable device sensors 200 in which a light source is used, a wearable device sensor 200 may emit the light from the light source and capture and process the reflected light data to decode the data contained on the machine-readable code 112. In some embodiments, as shown in FIG. 2, a device sensor may be internal to the housing of the wearable device 100. In some embodiments, the wearable device sensor 200 may be disposed near the distil end of the wearable device 100 such that the wearable device sensor 200 is directed out the distil end of the wearable device and toward the user's hand 102, as shown in FIG. 2. In such an embodiment, the housing may include a window (e.g., housing sensor window 204) allowing optical data to pass in and out of the wearable device 100 housing. Directing the wearable device sensor out the distil end of the wearable device 100 and towards the user's hand 102, allows a user to utilize the wearable device sensor 200 while the wearable device 100 is strapped to the user's arm 110. Still, in some embodiments, the wearable device sensor 200 may be external to the housing of the wearable device 100 while still remaining communicatively connected. As described in relation to FIG. 7, some or all of the functionality associated with the device sensor 200 may be performed by the sensor interface circuitry 710, the image processor 712, the processor 702, and/or any other connected processing device.

As depicted in FIG. 2, the example wearable device sensor 200 further includes a field of view 108. The depicted field of view 108 represents an example area from which the wearable device sensor 200 may capture environment data. Environment data may include color imagery, black and white imagery, infrared imagery, reflected laser and/or LED light, light detection and ranging (LIDAR) data, and other similar feedback from the surrounding environment. To accurately decode the data contained on a machine-readable code 112, substantially all of the machine-readable code 112 must be within the field of view 108 of the wearable device sensor 200. If the wearable device 100 and wearable device sensor 200 are improperly positioned, the user's hand 102 or user's arm 110 may partially or fully obstruct the field of view 108 and prevent the wearable device sensor 200 from capturing the full machine-readable code 112.

As depicted in FIG. 2, the example wearable device carriage 104 and/or wearable device strap 106 may further include a sensor window 202. The sensor window 202 may be any opening, lens, filter, or other similar feature that allows optical data to pass through and environmental data to be received by the wearable device sensor 200. In some embodiments, the sensor window 202 will be devoid of any material. In some embodiments, the sensor window 202 may contain a translucent or similar material that allows light and/or optical data to pass to and from the wearable device sensor 200.

Figure 3:
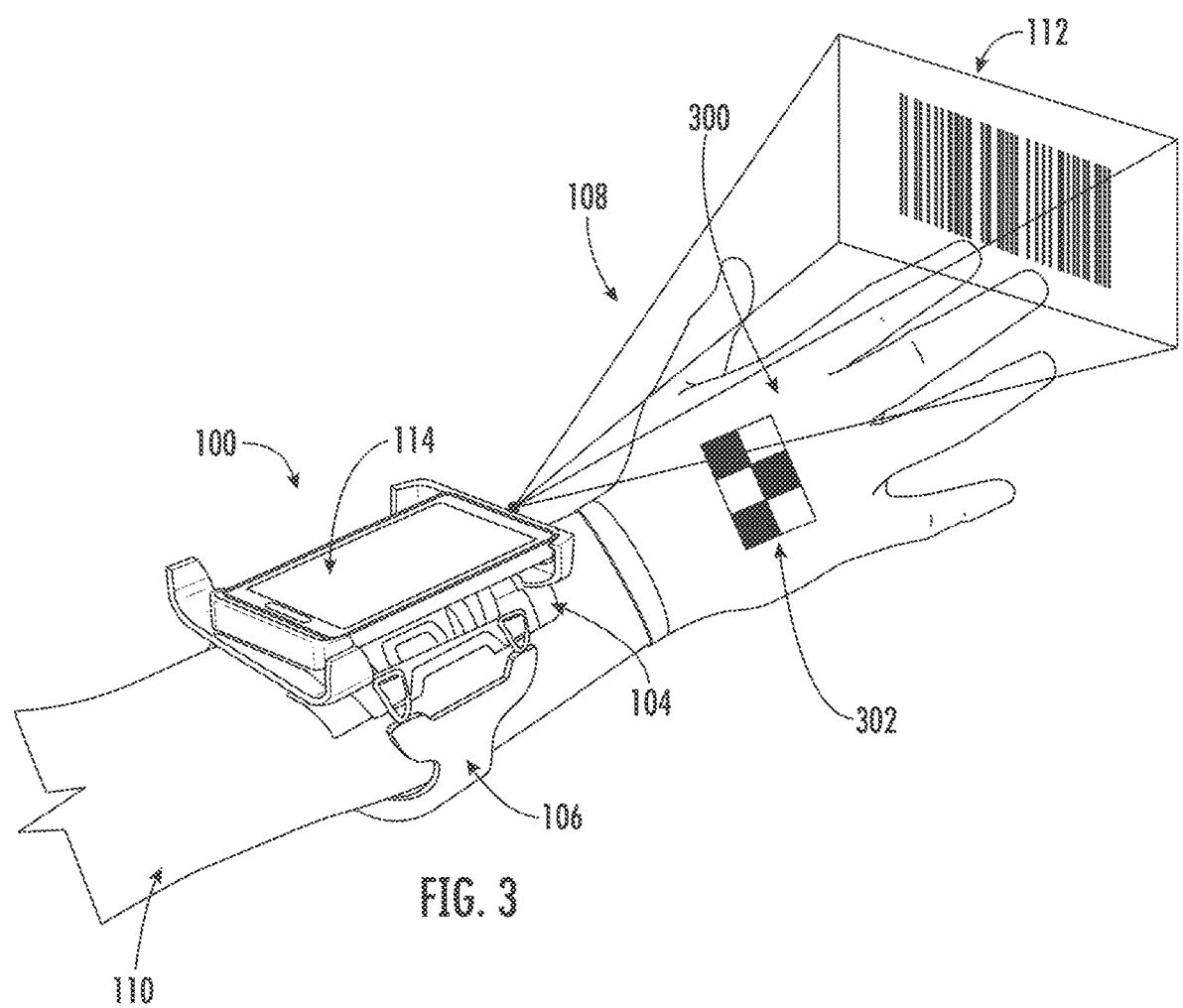
FIG. 3 illustrates a perspective view of an example wearable device worn by a user utilizing a glove with a calibrating symbol in accordance with an example embodiment of the present disclosure.

FIG. 3 illustrates a perspective view of an example wearable device 100 worn by a user utilizing a calibrating glove 300 to facilitate detection of a position of the wearable device 100. As depicted in the example embodiment of FIG. 3, the wearable device 100 is positioned such that the field of view 108 is directed toward the user's hand 102. The user's hand is covered by a calibrating glove 300 with a calibrating symbol 302 inscribed on the back. In some examples, a calibrating glove 300 may be made of any material, for example, leather, cotton, rubber, plastic, latex, neoprene, or other similar material.

In some embodiments, the calibrating glove 300 may include a calibrating symbol 302. A calibrating symbol 302 may be any symbol or marking of predetermined size visible in the field of view 108 of the wearable device sensor 200. The calibrating symbol 302 is depicted as a portion of a checkerboard pattern but the calibrating symbol 302 may be any symbol identifiable by the wearable device 100, for example, a line, a cross, a letter or number, and so on. In some embodiments, a wearable device 100 may be notified of the dimensions of the calibrating symbol 302. The dimensions of the calibrating symbol 302 may be programmed into the software of the wearable device 100, may be provided by the user upon initial launch or startup of the wearable device 100 and/or the computer program product. In some embodiments, the dimensions of the calibrating symbol 302 may be provided using the user interface 114 of the wearable device 100.

Figure 4:
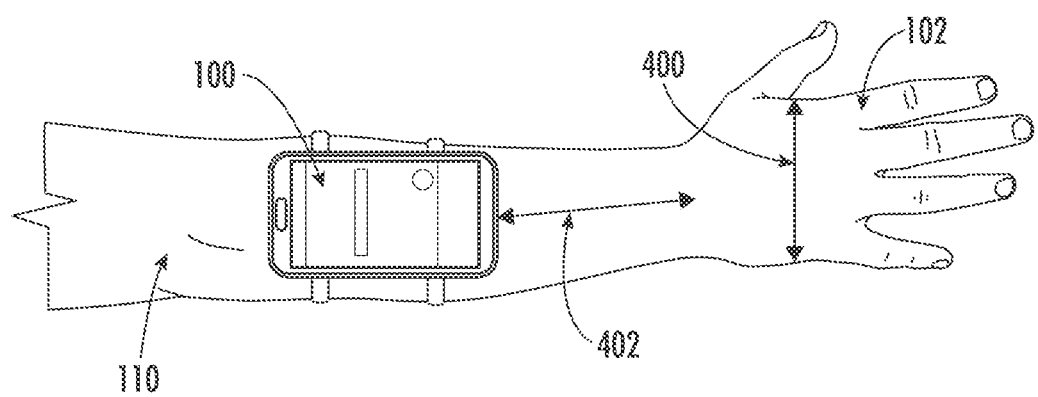
FIG. 4 illustrates a position of a wearable device in relation to a user's hand in accordance with an example embodiment of the present disclosure.

FIG. 4 illustrates an overhead view of an example position of the wearable device 100 on a user's arm 110. As depicted in the example embodiment of FIG. 4, a user's hand 102 may be used as the calibrating object defining a calibrating dimension (e.g., the width 400 of the user's hand 102). As FIG. 4 further depicts, in an instance in which the wearable device 100 is attached to the user's arm 110, a position of the user's arm 110 is defined relative to a part of the user's hand 102 (e.g., distance 402).

As depicted in FIG. 4, a user's hand 102 may be used as a calibrating object, defining a calibrating dimension. A calibrating dimension may be any feature or characteristic of the calibrating object (e.g. the user's hand 102) that may be detected by the wearable device sensor 200. For example, in some embodiments, the calibrating dimension may be the width 400 of the user's hand 102 as labeled in FIG. 4. Other examples of a calibrating dimension may be the length of the user's hand from the base of the palm to the start of the fingers, the length of the user's hand from the base of the hand to the tip of the fingers, the width or length of the user's fingers, and/or any combination thereof. In some embodiments, the calibrating dimension may be provided to the wearable device 100 by a user through, for example, the user interface 114. In some embodiments, the width 400 of the user's hand 102 may be provided to the wearable device 100 during initialization of the wearable device 100 and/or initialization of an accompanying computer program product.

FIG. 4 further depicts an example position of a wearable device 100 in relation to the calibrating object (e.g., user's hand 102). A position may be any location of the wearable device 100 with respect to the calibrating object. For example, a position could be a height above or below the calibrating object; the distance from the calibrating object or any part of the calibrating object to the wearable device 100; the yaw, pitch, or roll of the wearable device 100 with respect to the line between the wearable device sensor 200 and the calibrating object; the orientation of the wearable device 100 in relation to the calibrating object; the x, y, z location of the wearable device 100 in 3-D space relative to the calibrating object; and/or any combination thereof.

FIG. 4 depicts an example position (e.g., distance 402) of the wearable device 100 relative to the calibrating object (e.g., user's hand 102). While the depicted position, distance 402, is the distance from the wearable device 100 to the base of the user's hand 102, the distance to any detectable position on the user's hand 102 may be determined. For example, the distance from the wearable device 100 to the base of the fingers, the fingertips, the base of the thumb, the knuckles, or any similar detectable feature of the user's hand 102.

Figure 5:
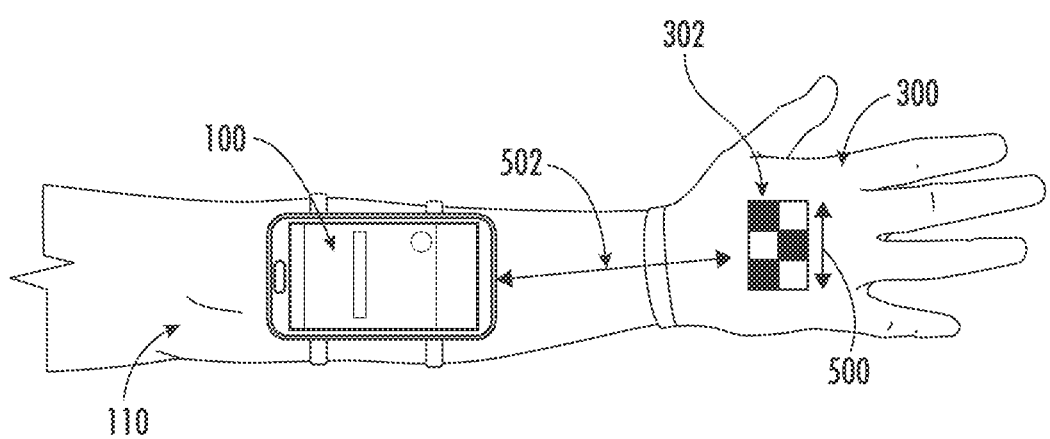
FIG. 5 illustrates a position of a wearable device in relation to a calibrating symbol on a user's glove in accordance with an example embodiment of the present disclosure.

FIG. 5 illustrates an overhead view of an example position of the wearable device 100 on a user's arm 110 with respect to a calibrating glove 300. As depicted in the example embodiment of FIG. 5, a calibrating glove 300 may be used as the calibrating object defining a calibrating dimension (e.g., the width 500 of the calibrating symbol 302). As FIG. 5 further depicts, in an instance in which the wearable device 100 is attached to the user's arm 110, a position of the wearable device 100 is defined relative to a part of the calibrating symbol 302 (e.g., distance 502).

In the depicted embodiment of FIG. 5, a calibrating glove 300 is used as a calibrating object and further defines the calibrating dimension. As the example embodiment of FIG. 5 depicts, the calibrating dimension may be any feature or characteristic of the calibrating object (e.g. the calibrating glove 300) that may be detected by the wearable device sensor 200 and/or any dimension or feature of the calibrating symbol 302 inscribed on the calibrating glove 300. For example, in some embodiments, the calibrating dimension may be the width 500 of the calibrating symbol 302 as labeled in FIG. 5. Other non-limiting examples of a calibrating dimension may be the height of the calibrating symbol 302, the dimensions of any portion of the calibrating symbol 302 (e.g., the width of a single checkerboard box), the distance from the calibrating symbol 302 to another feature or symbol on the calibrating symbol 302, or other similar dimension. In some examples a set of symbols may be used as the calibrating symbol 302. In such examples, the calibrating dimension of the calibrating symbol 302 may be the distance between a pair or set of identified symbols.

FIG. 5 further depicts an example position of a wearable device 100 in relation to the calibrating object (e.g., the calibrating glove 300) based on the inscribed calibrating symbol 302. As described in relation to FIG. 4, a position may be any location of the wearable device 100 with respect to the calibrating object. FIG. 5 depicts an example position as the distance from the wearable device 100 to the closest point on the calibrating symbol 302 (e.g., distance 502). However, the position may be the distance from the wearable device 100 to any portion or feature of the calibrating symbol 302, or any other feature of the calibrating glove 300. In some embodiments, more than one symbol may be inscribed on the calibrating glove 300. In some embodiments, one symbol or set of symbols may be used to define the calibrating dimension, while a second symbol or set of symbols may be used to determine the position of the wearable device 100 relative to the calibrating object.

Figure 6:
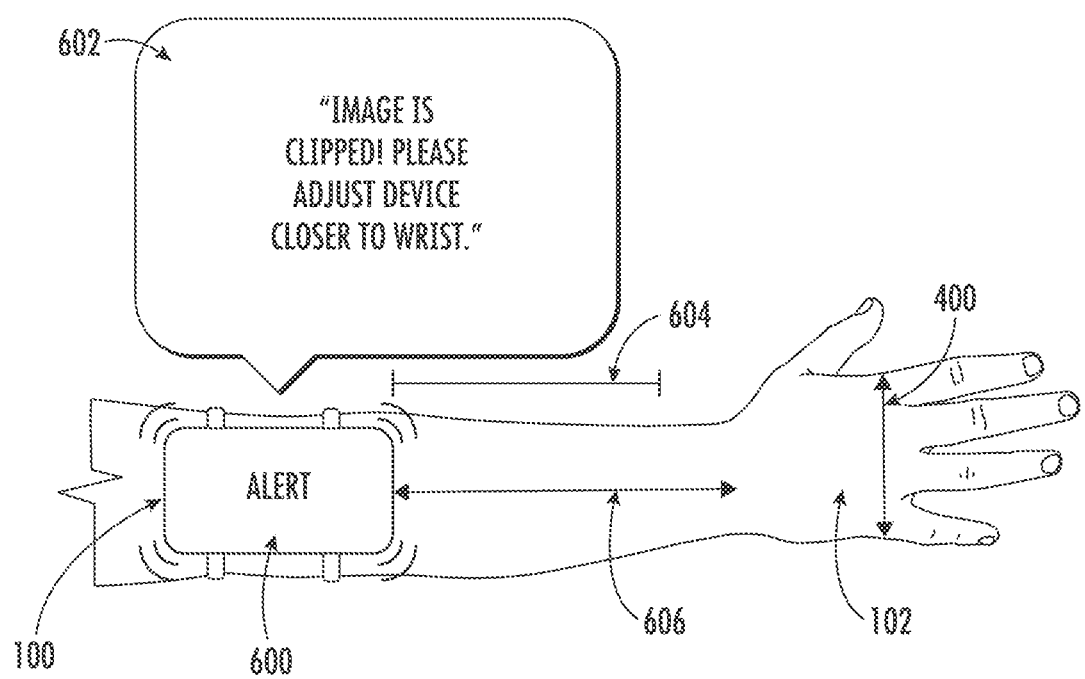
FIG. 6 illustrates an example wearable device alerting a user to adjust a position in accordance with an example embodiment of the present disclosure.

FIG. 6 illustrates an example embodiment of a wearable device 100 alerting the user to adjust the position of the wearable device 100 in an instance in which the wearable device 100 determines the wearable device 100 is improperly positioned. FIG. 6 depicts a wearable device 100 positioned on a user's arm relative to a calibrating object (e.g., the user's hand 102) at a position indicated by the distance 606 that does not fall within the acceptable position range 604. FIG. 6 further depicts a displayed text alert 600, an audible audio alert 602, and vibrating haptic feedback in response to the determination that the wearable device 100 is improperly positioned.

FIG. 6 depicts an example position of the wearable device 100, represented by the distance 606, that is outside the acceptable position range 604, such that the captured wearable device sensor 200 image is clipped or likely to be clipped or otherwise obstructed. An acceptable position range 604 is any position or range of positions for which the wearable device 100 may reliably operate without obstruction of the wearable device sensor 200. In some embodiments, the acceptable position range 604 may be represented as a range of distances. For example, if the position of the wearable device 100 is represented as a distance in centimeters from the base of the user's hand 102 to the wearable device 100 (as shown by distance 606), an acceptable position range 604 may be, for example, any measured distance preferably between 0 and 15 centimeters, more preferably between 3 and 12 centimeters, most preferably between 5 and 10 centimeters. In such an embodiment, the acceptable position range 604 may act as a predetermined threshold. In any instance in which the position of the wearable device 100 is beyond the maximum distance of the acceptable position range 604, the position exceeds the predetermined threshold. Further, in any instance in which the position of the wearable device 100 is closer than the minimum distance of the acceptable position range 604, the position also exceeds the predetermined threshold. Both positions may be considered to exceed the predetermined threshold and the wearable device 100 may be deemed to be improperly positioned.

As a further illustration using the acceptable position range 604 above, if the wearable device 100 determines the distance from the wearable device 100 to the calibrating object is more than 20 centimeters, the wearable device 100 has exceeded the predetermined threshold and the wearable device 100 is improperly positioned, triggering an alert. In addition, if the wearable device 100 determines the distance from the wearable device 100 to the calibrating object is less than 10 centimeters, the wearable device 100 has once again exceeded the predetermined threshold and the wearable device 100 is improperly positioned, triggering an alert. In some embodiments, the acceptable position range 604 may be a single value, for example 15 centimeters. In such embodiments, the predetermined threshold may be exceeded if the wearable device 100 determines the distance from the wearable device 100 to the calibrating object is greater than 15 centimeters.

In some embodiments, the acceptable position range 604 may be pre-determined for all users and indicated to the wearable device 100 by user input via the user interface 114, or otherwise through program or device initialization. In some embodiments, the acceptable position range 604 may be unique to a specific user. In such an instance the user may be required to notify the wearable device 100 of the acceptable position range 604 and the acceptable position range 604 may be saved to memory storage along with a user identifier corresponding to the user. In some embodiments, the acceptable position range 604 may be adjusted or modified based on determined characteristics of the user. For example, a wearable device 100 may determine the width 400 of the user's hand 102 and adjust or modify the acceptable position range 604 based on the determined measurement. In some embodiments, the acceptable position range 604 may be adjusted based on the orientation (e.g., yaw, pitch, or roll relative to the sensor direction) of the wearable device 100. Still, in some embodiments, the acceptable position range 604 may be adjusted or modified based on the x, y, z location of the wearable device 100 relative to the calibrating object, such as, the height of the wearable device 100 above or below the calibrating object.

In some examples, the acceptable position range 604 may be adjusted in an instance in which a series of decodes fail. For example, if a series of images are occluded or are clipped in such a way that a machine-readable code 112 is not able to be decoded. In some examples, the acceptable position range 604 may be increased and/or decreased until a successful decode occurs. In such cases, an updated acceptable position range may be saved to memory storage along with a user identifier corresponding to the user.

FIG. 6 further depicts a variety of mechanisms that may be used to alert the user of the improper position of the wearable device 100. Examples of alert mechanisms include, but are not limited to a visual text alert 600, an audible audio alert 602, and/or haptic feedback. A visual text alert 600 may be any visual text, graphic, or other display capable of alerting the user of the improper positioning of the wearable device 100. In some embodiments, the visual text alert 600 may be displayed on the user interface 114 of the wearable device 100. In some embodiments, the graphic or text display may direct the user on how to resolve the improper position issue. For example, the text could indicate to the user that the wearable device 100 may need to be moved at least 5 centimeters closer to the wrist.

An audio alert 602 may be any sound, sequence of sounds, or speech capable of alerting the user of the improper positioning of the wearable device 100. In some embodiments, a sound or sequence of sounds may indicated to the user the improper position of the wearable device 100, for example, a beep. In some embodiments, the pattern or tone of the sound may indicate to the user the direction the wearable device 100 may need to be moved. For example, two beeps may direct a user to move the wearable device 100 closer to the wrist while one beep directs the user to move the device further away from the wrist. In some embodiments, audible speech may be generated by the wearable device 100 indicating the improper positioning of the wearable device 100 and/or indicating to the user the steps necessary to properly position the wearable device 100.

A wearable device 100 may also be capable of providing haptic feedback to a user, indicating the wearable device 100 is improperly positioned. In some embodiments, a wearable device 100 may generate a constant or patterned vibration, indicating the improper position of the wearable device 100. In some embodiments, the pattern or length of the haptic feedback may indicate to the user the direction the wearable device 100 may need to be moved. For example, two quick vibrations may direct a user to move the wearable device 100 closer to the wrist while one long vibration directs the user to move the device further away from the wrist.

Figure 7:
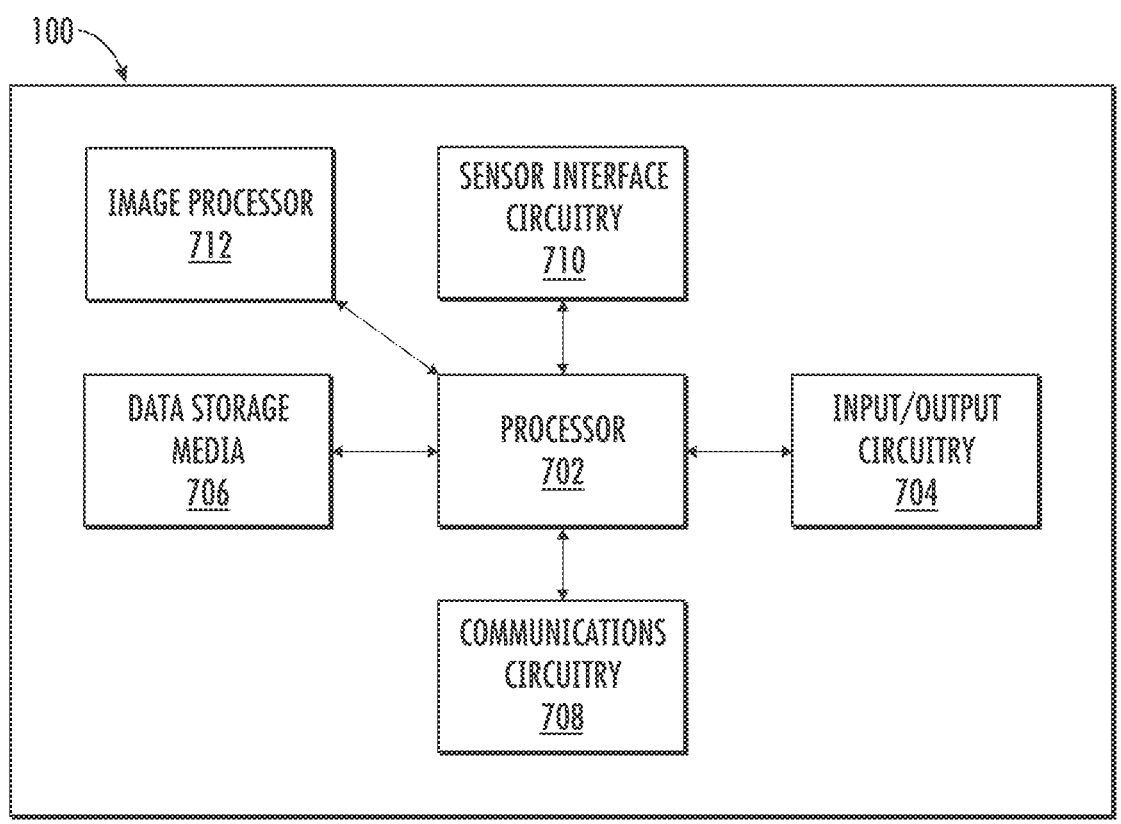
FIG. 7 illustrates an example block diagram showing example components of a wearable device in accordance with some embodiments of the present disclosure.

FIG. 7 shows a schematic block diagram of example circuitry, some or all of which may be included in a wearable device 100. In accordance with some example embodiments, a wearable device 100 may include various means, such as a processor 702, a data storage media 706, input/output circuitry 704, communications circuitry 708, sensor interface circuitry 710, and an image processor 712. In some embodiments, the wearable device 100 is configured, using one or more of the sets of circuitry 702, 706, 704, 708, 710, and/or 712, to execute the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the wearable device 100 provide or supplement the functionality of other particular sets of circuitry. For example, the processor 702 in some embodiments provides processing functionality to any of the sets of circuitry, the data storage media 706 provides storage functionality to any of the sets of circuitry, the communications circuitry 708 provides network interface functionality to any of the sets of circuitry, and/or the like.

In some embodiments, the processor 702 (and/or co-processor or any other processing circuitry assisting or otherwise associated with the processor) is/are in communication with the data storage media 706 via a bus for passing information among components of the wearable device 100. In some embodiments, for example, the data storage media 706 is non-transitory and may include, for example, one or more volatile and/or non-volatile memories. In other words, for example, the data storage media 706 in some embodiments includes or embodies an electronic storage device (e.g., a computer readable storage medium). In some embodiments, the data storage media 706 is configured to store information, data, content, applications, instructions, or the like, for enabling the wearable device 100 to carry out various functions in accordance with example embodiments of the present disclosure.

The processor 702 may be embodied in a number of different ways. For example, in some example embodiments, the processor 702 includes one or more processing devices configured to perform independently. Additionally or alternatively, in some embodiments, the processor 702 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the wearable device 100, and/or one or more remote or "cloud" processor(s) external to the wearable device 100.

In an example embodiment, the processor 702 is configured to execute instructions stored in the data storage media 706 or otherwise accessible to the processor. Alternatively or additionally, the processor 702 in some embodiments is configured to execute hard-coded functionality. As such, whether configured by hardware or software methods, or by a combination thereof, the processor 702 represents an entity (e.g., physically embodied in circuitry) capable of performing operations according to an embodiment of the present disclosure while configured accordingly. Alternatively or additionally, as another example in some example embodiments, when the processor 702 is embodied as an executor of software instructions, the instructions specifically configure the processor 702 to perform the algorithms embodied in the specific operations described herein when such instructions are executed.

As one particular example embodiment, the processor 702 includes hardware, software, firmware, and/or a combination thereof, that initializes a wearable device sensor 200 via the sensor interface circuitry 710, for example including particular data (e.g., connections, states, behaviors, and/or the like) from configuration data.

In some embodiments, the wearable device 100 includes input/output circuitry 704 that provides output to the user and, in some embodiments, to receive an indication of a user input. In some embodiments, the input/output circuitry 704 is in communication with the processor 702 to provide such functionality. The input/output circuitry 704 may comprise one or more user interface(s) (e.g., user interface 114) and in some embodiments includes a display that comprises the interface(s) rendered as a web user interface, an application user interface, a user device, a backend system, or the like. The processor 702 and/or input/output circuitry 704 comprising the processor may be configured to control one or more functions of one or more user interface elements through computer program instructions (e.g., software and/or firmware) stored on a memory accessible to the processor (e.g., data storage media 706, and/or the like). In some embodiments, the input/output circuitry 704 includes or utilizes a user-facing application to provide input/output functionality to a client device and/or other display associated with a user.

The communications circuitry 708 includes any means such as a device or circuitry embodied in either hardware or a combination of hardware and software that is configured to receive and/or transmit data from/to a network and/or any other device, circuitry, or module in communication with the wearable device 100. In this regard, the communications circuitry 708 includes, for example in some embodiments, a network interface for enabling communications with a wired or wireless communications network. Additionally or alternatively in some embodiments, the communications circuitry 708 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 708 includes circuitry for interacting with the antenna(s) and/or other hardware or software to cause transmission of signals via the antenna(s) or to handle receipt of signals received via the antenna(s). In some embodiments, the communications circuitry 708 enables transmission to and/or receipt of data from a client device in communication with the wearable device 100.

The sensor interface circuitry 710 includes hardware, software, firmware, and/or a combination thereof, that supports various functionality associated with the wearable device sensor 200. For example, in some embodiments, the sensor interface circuitry 710 includes hardware, software, firmware, and/or a combination thereof, that receives, decodes, and/or otherwise processes or pre-processes captured image data. Additionally or alternatively, in some embodiments, the sensor interface circuitry 710 includes hardware, software, firmware, and/or a combination thereof, that stores and/or otherwise caches image data for subsequent use, retrieval, transmission, and/or other processing. In some embodiments, the sensor interface circuitry 710 includes a separate processor, specially configured field programmable gate array (FPGA), or a specially programmed application specific integrated circuit (ASIC).

In an example embodiment sensor interface circuitry 710 may be an optical reader. The optical reader may include an illumination assembly for illuminating a target object, such as a one-dimensional or two-dimensional machine-readable code 112 symbol, and an imaging assembly for receiving an image of the object and generating an electrical output signal indicative of the data which is optically encoded therein. Illumination assembly may, for example, include an illumination source assembly, such as one or more LEDs, together with an illuminating optics assembly, such as one or more reflectors, for directing light from light source in the direction of the target object.

In an embodiment, sensor interface circuitry 710 may include an image sensor, such as a two-dimensional CCD or CMOS solid state image sensor (rolling shutter or global shutter), together with an imaging optics assembly for receiving and focusing an image of the object onto the image sensor. The array-based imaging assembly may be replaced by a laser scanning based imaging assembly comprising a laser source, a scanning mechanism, emit and receive optics, a photodetector and accompanying signal processing circuitry.

The image processor 712, includes hardware, software, firmware, and/or a combination thereof, that supports various functionality associated with processing the received captured image data, including, for example, optical data from an optical reader, and/or image data from an image sensor.

In an example embodiment, the image processor 712 may perform image processing techniques to prepare the captured image data for further processing by, for example, removing optical noise, accentuating features such as edges, determining features incident to identifying objects of interest, calculating feature values incident to recognizing objects represented by the captured image data, and other similar techniques known to a person of ordinary skill in the art.

In some embodiments, the image processor 712 may utilize image processing techniques on the processed captured image data to identify objects of interest, for example, a user's hand 102, identifying features of a user's hand 102, a calibrating symbol 302, identifying features of the calibrating symbol 302, a machine-readable code 112, and similar objects of interest.

In some embodiments, the image processor 712 may utilize further image processing techniques to identify the dimensions of identified objects. The image processor 712 may first identify the dimensions of the objects of interest in pixel-space. In some embodiments, the image processor 712 may further determine the real-world dimensions of the identified objects.

Additionally or alternatively, in some embodiments, one or more of the sets of circuitry 702-712 are combinable. Additionally or alternatively, in some embodiments, one or more of the sets of circuitry perform some or all of the functionality described associated with another component. For example, in some embodiments, one or more sets of circuitry 702-712 are combined into a single module embodied in hardware, software, firmware, and/or a combination thereof. Similarly, in some embodiments, one or more of the sets of circuitry, for example sensor interface circuitry 710, is/are combined such that the processor 702 performs one or more of the operations described above with respect to each of these circuitry individually.

Figure 8:
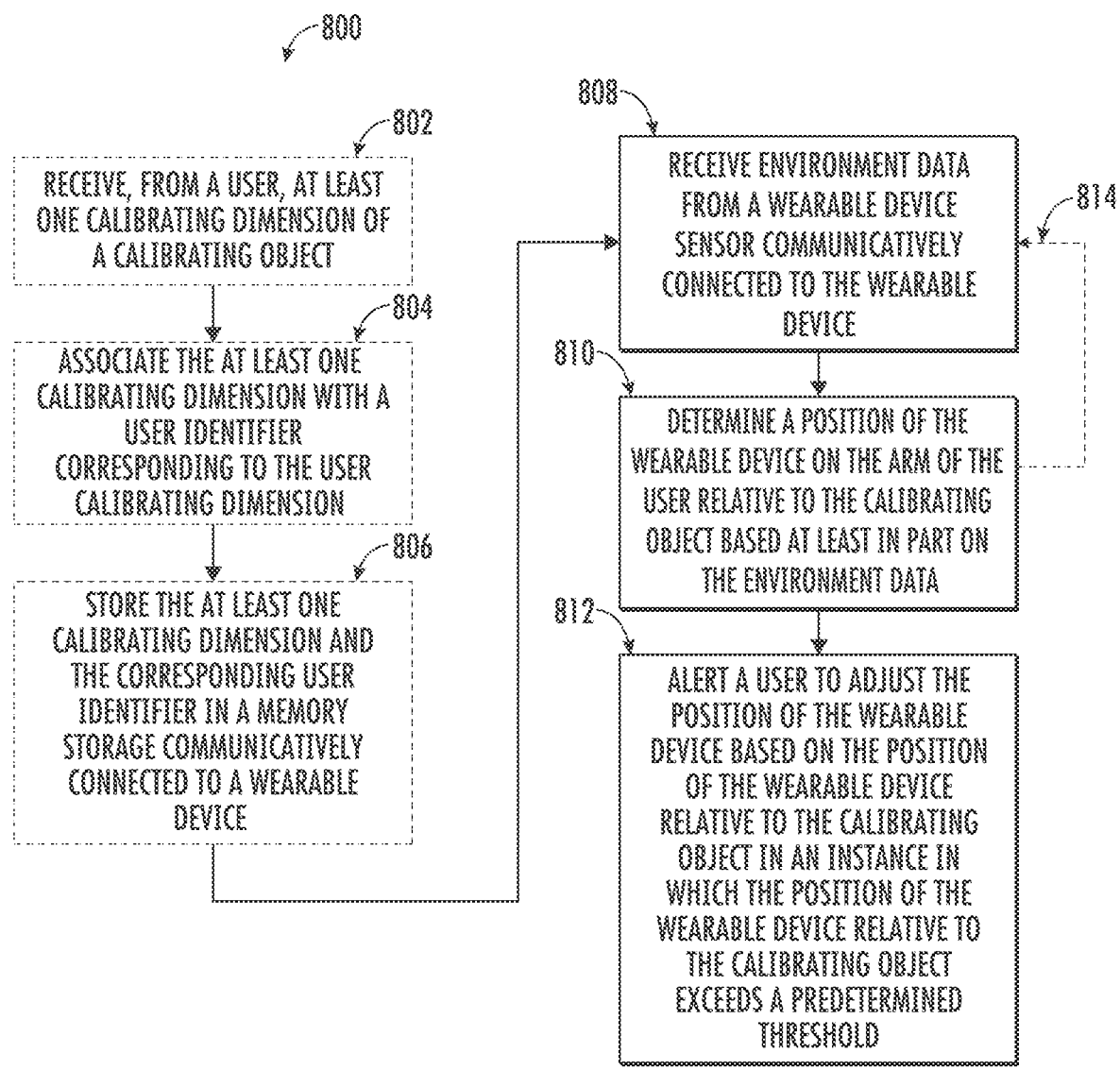
FIG. 8 depicts a flowchart illustrating example operations performed to calibrate a wearable device to enable the wearable device to alert a user to adjust a position in accordance with an example embodiment of the present disclosure.

Referring now to FIG. 8, an example flow diagram illustrating an example method 800 of alerting a user to adjust a wearable device 100 is illustrated, in accordance with some embodiments of the present disclosure. In some embodiments, the operations illustrated in FIG. 8 may, for example, be performed by, with the assistance of, and/or under the control of a wearable device 100, as described above. In this regard, performance of the operation may invoke one or more of the processor 702, input/output circuitry 704, data storage media 706, and/or communications circuitry 708.

In the example shown in FIG. 8, the example method 800 starts at block 802. As shown in block 802, the method 800 may include receiving, from a user, at least one calibrating dimension of a calibrating object. A calibrating object may be any object with a dimension determined previous to operation and known to the wearable device 100.

FIG. 4 illustrates an example embodiment in which a user's hand 102 is used as a calibrating object. FIG. 5 illustrates another example embodiment in which a calibrating glove 300 is used as a calibrating object. As described with reference to FIGS. 4 and 5, a calibrating dimension may be any feature or characteristic of the calibrating object (e.g. the user's hand 102 or the calibrating glove 300) that may be measured and input to the wearable device 100 and subsequently detected by the wearable device sensor 200. A user may indicate to the wearable device 100 a calibrating dimension by user input via the user interface 114, or otherwise during the initialization of the wearable device 100, during application initialization, or through configuration of the device or application.

As shown in block 804, the method 800 may include associating the at least one calibrating dimension with a user identifier corresponding to the user calibrating dimension. A user identifier may be any mechanism for identifying a particular user of the wearable device 100. For example, an alphanumeric identification number, fingerprint, keycard, radio frequency identification (RFID), retina scan, facial recognition, or any other mechanism for uniquely identifying a user. A user identifier may be indicated to the wearable device 100 via the user interface 114 or via a scanner, sensor, or other device capable of uniquely identifying the user. Upon receipt of the user's identifier and receipt of one or more calibrating dimensions associated with the user identifier, a wearable device 100 may associate the user identifier and corresponding calibration dimension for example, by creating a data object entry containing both the user identifier and the one or more calibrating dimensions.

As shown in block 806, the method 800 may include storing the at least one calibrating dimension and the corresponding user identifier in a memory storage (e.g. data storage media 706) communicatively connected to a wearable device 100. Upon receipt and association of the user's identifier and receipt of one or more calibrating dimensions associated with the user identifier, a wearable device 100 may store the user identifier and corresponding calibration dimension in a communicatively connected storage device (e.g., data storage media 706). Storage and subsequent access of a calibration dimension and an associated user identifier may allow a user to utilize the wearable device 100 executing the example method 800 without determining any calibration dimensions and/or indicating to the wearable device 100 the calibration dimensions of the calibrating object. For example, in an example embodiment, the user may provide a unique identifier to the wearable device 100, measure the calibrating dimension (e.g., the width 400 of the user's hand 102), and allow the wearable device 100 to associate and store the input parameters. When a user desires to utilize the device again, the user may once again provide the user identifier. The wearable device 100 may retrieve the calibrating dimensions associated with the user identifier and load the calibrating dimensions (e.g., the width 400 of the user's hand 102) for the particular user. The wearable device 100 may then execute the method 800 without requiring input of calibrating dimensions from the user.

As shown in block 808, the method 800 may include receiving environment data from a wearable device sensor 200 communicatively connected to the wearable device 100. As described in reference to FIG. 2, a wearable device sensor 200 may be any sensor device capable of receiving optical data from the surrounding environment. In some embodiments, the received environment data may be indicative of a target machine-readable code 112, allowing the wearable device 100 to recognize the machine-readable code 112 and decode the information contained thereon. In some embodiments, the wearable device sensor 200 may also receive environment data indicative of a calibrating object (e.g., a user's hand 102 or a calibrating glove 300 containing a calibrating symbol 302). In some embodiments, a wearable device 100 may be communicatively connected to more than one wearable device sensor 200. In such embodiments, one wearable device sensor 200 may be configured to capture environment data indicative of a target machine-readable code 112 while a second wearable device sensor 200 may be configured to capture data indicative of a calibrating object. A wearable device sensor 200 may be configured to transmit received environment data to a communicatively connected wearable device 100. In some embodiments, a wearable device sensor 200 may encode, process, pre-process, or otherwise modify the received environment data before transmitting the data to the wearable device 100. In some embodiments, the environment data may be transmitted to the wearable device 100 as raw data.

As shown in block 810, the method 800 may include determining a position of the wearable device 100 relative to the calibrating object. As discussed with reference to FIG. 4, a position of the wearable device 100 relative to the calibrating object could be, for example, a height above or below the calibrating object; the distance from the calibrating object or any part of the calibrating object to the wearable device 100; the yaw, pitch, or roll of the wearable device 100 with respect to the calibrating object; the orientation of the wearable device 100 in relation to the calibrating object; the x, y, z location of the wearable device 100 in 3-D space relative to the calibrating object; and/or any combination thereof.

In some embodiments, to determine a position based on the received environment data, a wearable device 100 may include an image processor 712 for identifying a calibrating object and determining a distance from the calibrating object. As described in relation to FIG. 7, an image processor 712 may utilize image processing techniques to identify and measure objects of interest, including but not limited to the calibrating object (e.g., a user's hand 102 or a calibrating glove 300 containing a calibrating symbol 302) and the calibrating dimension. For example, if the calibrating object is a user's hand 102, the image processor 712 may determine the edges in the captured image using image processing techniques and extract features for identifying the back of the hand.

In some embodiments, after a calibrating dimension is identified, the image processor 712 may measure the calibrating dimension in pixels. For example, if the calibrating object is a user's hand 102 and the calibrating dimension is the width 400 of the user's hand 102, a wearable device 100 may determine the width 400 of the user's hand 102 in pixels. In some embodiments, the image processor 712 in coordination with the processor 702 and/or sensor interface circuitry 710 may then utilize the calibrating dimension input by the user and including a real-world distance, along with the known characteristics of the wearable device sensor 200 to determine a distance of the wearable device 100 from the calibrating object. For example, in an instance in which the calibrating dimension is the width 400 of the user's hand 102, a user may input the width 400 of the user's hand 102 in real-world dimensions (e.g., 9 centimeters). The image processor 712 may then determine the width 400 of the user's hand 102 in pixels (e.g., 800 pixels). The image processor 712 and/or the processor 702 may then use the properties of the wearable device sensor 200 to determine the distance from the calibrating object to the wearable device 100.

In another example embodiment to determine the position of the wearable device 100, a user may direct the wearable device sensor 200 toward an image or machine-readable code 112 of a known or determinable size (e.g., the size of the machine-readable code 112 may be decoded). In such an embodiment, the image processor 712 may determine the position of the wearable device 100 based on the relative sizes of the calibrating object and the decoded machine-readable code 112.

In further example embodiment, the user may simply direct the wearable device sensor toward an image or machine-readable code 112 of a known or determinable size and the image processor 712 may determine the extent of the occlusion of the image based on the known measurements. In such an embodiment, the image processor 712 may determine the position of the wearable device 100 and determine whether the user should be alerted to adjust the wearable device 100.

As described above, in some embodiments, one or more of the described steps may be performed on the wearable device sensor 200, the sensor interface circuitry 710, the processor 702, and/or the image processor 712.

As shown in block 812, the method 800 may include alerting a user to adjust the position of the wearable device 100 based on the position of the wearable device 100 relative to the calibrating object in an instance in which the position of the wearable device 100 relative to the calibrating object exceeds a predetermined threshold. As described in reference to FIG. 6, a predetermined threshold may be indicated to the wearable device 100 by user input via the user interface 114, or otherwise through program or device initialization. The predetermined threshold may be represented as a single maximum value (e.g., 15 centimeters) or a range of acceptable values (e.g., 10-20 centimeters). If the predetermined value is exceeded (e.g., the measured distance from the wearable device 100 to the calibrating object is above or below the range of acceptable values), an alert may be triggered. As described with reference to FIG. 6, an alert may be generated and provided to the user via a visual graphic or text alert 600, an audible audio alert 602, and/or haptic feedback. In some embodiments, one or more of these methods of alert may be utilized to inform a user of the detected improper position of the wearable device 100.

As indicated by loop 814, the method 800 may include determining, at a predetermined interval, the position of the wearable device 100 relative to the calibrating object and alerting a user to adjust the position of the wearable device 100 if the wearable device 100 determines a position of the wearable device 100 relative to the calibrating object exceeds a predetermined threshold. An interval may be any period of time upon the expiration of which the method 800 will cause the wearable device 100 to once again determine the position of the wearable device 100 based on environment data and alert the user if the wearable device 100 is improperly positioned. In some embodiments, an interval may be a fixed period of time, for example, every 1 minute. In some embodiments, an interval may vary based on a number of different factors, including, for example, the length of use, the amount of detected motion, the number of scanned machine-readable labels 112, the rate of change in position of the wearable device 100. For example, if a wearable device 100 detects minimal movement from the user, or in the position of the wearable device 100, the interval may be extended, for example, to 10 minutes. However, if the wearable device 100 detects substantial user movement, change in position of the wearable device 100, and/or a high number of scanned machine-readable labels 112, the interval may be shortened, for example, to 30 seconds. In some embodiments, the interval may be provided by user input via the user interface 114. If at the expiration of an interval, the wearable device 100 determines the wearable device 100 is improperly positioned, the wearable device 100 may alert the user to adjust the position of the wearable device 100.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a wearable scanning device, however, one skilled in the art may recognize that such principles may be applied to any apparatus that must be attached to an appendage or other surface in a specific position. Alternative embodiments that result from combining, integrating, and/or omitting features of the embodiment(s) are also within the scope of the disclosure. Accordingly, the scope of protection is not limited by the description set out above.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A method for alerting a user to adjust a wearable device, the method comprising:
receiving environment data from a wearable device sensor communicatively connected to the wearable device, wherein the wearable device is mountable on an arm of the user such that the wearable device sensor is directed toward a hand of the user, wherein the environment data comprises a representation of at least a portion of a calibrating object having at least one calibrating dimension of a predetermined size and a target machine-readable code having a determinable size;
decoding the target machine-readable code;

determining a position of the wearable device on the arm of the user based on a first size of the calibrating object and a second size of the target machine-readable code; and alerting the user to adjust the position of the wearable device based on the position of the wearable device relative to the calibrating object in an instance in which the position of the wearable device relative to the calibrating object exceeds a predetermined threshold.

2. The method of claim 1, wherein determining the position of the wearable device on the arm of the user is based on determining an extent of an occlusion of the representation of at least the portion of the calibrating object having at least one calibrating dimension of the predetermined size.

3. The method of claim 1, further comprising receiving, from the user, the at least one calibrating dimension of the calibrating object.

4. The method of claim 3, wherein the at least one calibrating dimension is associated with a user identifier corresponding to the user and stored in a memory storage communicatively connected to the wearable device.

5. The method of claim 1, wherein the calibrating object is at least one of the hand of the user, a symbol, and a set of symbols.

6. The method of claim 5, wherein the at least one of a symbol and the set of symbols is inscribed on a glove.

7. The method of claim 1, further comprising continually determining at an interval the position of the wearable device relative to the calibrating object.

8. The method of claim 1, wherein the user is directed to adjust the position of the wearable device by at least one of a sound, image, text, and haptic feedback.

9. The method of claim 1, wherein the wearable device sensor further comprises a housing and the wearable device sensor is disposed within the housing.

10. A wearable apparatus mountable on an arm of a user, the wearable apparatus comprising:
  a wearable device sensor communicatively connected to the wearable apparatus and directed toward a hand of the user, wherein the wearable device sensor collects environment data comprises a representation of at least a portion of a calibrating object having at least one calibrating dimension of a predetermined size and a target machine-readable code having a determinable size;
  at least one processor; and
  at least one memory including program code, the at least one memory and the program code configured to, with the at least one processor, cause the wearable apparatus to at least:
    receive environment data from the wearable device sensor;
    decode the target machine-readable code;
    determine a position of the wearable apparatus on the arm of the user based on a first size of the calibrating object and a second size of the target machine-readable code; and
    alert the user to adjust the position of the wearable apparatus based on the position of the wearable apparatus relative to the calibrating object.

11. The wearable apparatus of claim 10, wherein determining the position of the wearable apparatus on the arm of the user is based on determining an extent of an occlusion of the representation of at least the portion of the calibrating object having at least one calibrating dimension of the predetermined size.

12. The wearable apparatus of claim 10, further configured to receive, from the user, the at least one calibrating dimension of the calibrating object.

13. The wearable apparatus of claim 12, wherein the at least one calibrating dimension is associated with a user identifier corresponding to the user and stored in a memory storage communicatively connected to the wearable apparatus.

14. The wearable apparatus of claim 10, wherein the calibrating object is at least one of the hand of the user, a symbol, and a set of symbols.

15. The wearable apparatus of claim 14, wherein the at least one of a symbol and the set of symbols is inscribed on a glove.

16. The wearable apparatus of claim 10, further configured to continually determine at an interval the position of the wearable apparatus relative to the calibrating object.

17. The wearable apparatus of claim 10, wherein the user is directed to adjust the position of the wearable apparatus by at least one of a sound, image, text, and haptic feedback.

18. The wearable apparatus of claim 10, wherein the wearable device sensor further comprises a housing and the wearable device sensor is disposed within the housing.

19. A computer program product for alerting a user to adjust a wearable device, the computer program product comprising at least one non-transitory computer-readable storage medium storing program instructions that, when executed, cause the computer program product to:
  receive environment data from a wearable device sensor communicatively connected to the wearable device, wherein the wearable device is mountable on an arm of the user such that the wearable device sensor is directed toward a hand of the user, wherein the environment data comprises a representation of at least a portion of a calibrating object having at least one calibrating dimension of a predetermined size and a target machine-readable code having a determinable size;
  decode the target machine-readable code;
  determine a position of the wearable device on the arm of the user based on a first size of the calibrating object and a second size of the target machine-readable code; and
  alert the user to adjust the position of the wearable device based on the position of the wearable device relative to the calibrating object in an instance in which the position of the wearable device relative to the calibrating object exceeds a predetermined threshold.

20. The computer program product of claim 19, further configured to continually determine at an interval the position of the wearable device relative to the calibrating object.

* * * * *